UNITED STATES PATENT OFFICE.

CARL SCHLEUSSNER, OF HÖCHST-ON-THE-MAIN, GERMANY, ASSIGNOR TO THE FARBWERKE, VORMALS MEISTER, LUCIUS & BRÜNING, OF SAME PLACE.

NAPHTHAZARIN SULFUR DYE AND PROCESS OF MAKING SAME.

SPECIFICATION forming part of Letters Patent No. 651,122, dated June 5, 1900.

Application filed April 5, 1900. Serial No. 11,762. (Specimens.)

*To all whom it may concern:*

Be it known that I, CARL SCHLEUSSNER, Ph. D., a citizen of the Empire of Germany, residing at Höchst-on-the-Main, Germany, have invented certain new and useful Improvements in the Manufacture of Cotton Dyestuffs, of which the following is a specification.

I have found that by heating naphthazarin with alkali polysulfids in the presence of zinc chlorid a valuable cotton dyestuff may be obtained.

I illustrate my process as follows: A mixture of thirty parts, by weight, of naphthazarin; one hundred and fifty parts, by weight, of sodium sulfid; thirty parts, by weight, of sulfur; fifteen parts, by weight, of zinc chlorid of 40° Baumé specific gravity, and one hundred and fifty parts, by weight, of water is evaporated to dryness and then heated to 160° to 170° until the color of the product no longer increases in intensity. The mass may then be directly employed for dyeing purposes.

When pulverized, the dyestuff is a blue-gray powder, easily soluble in water. The concentrated solution is blue and the diluted is red violet. Mineral acids precipitate the dye acid, which is soluble in alkali or alkali carbonates with a red violet to blue color.

The dyestuff directly dyes cotton red-violet shades, the dye becoming on subsequent treatment with copper salts a deep and fast black.

Having now described my invention, what I claim is—

1. The herein-described process for the manufacture of a red-violet cotton dyestuff, which consists in heating naphthazarin with alkali polysulfid while adding zinc chlorid, substantially as described.

2. As a new product, the dyestuff obtained by heating naphthazarin with alkali polysulfid while adding zinc chlorid, being a blue-gray powder, soluble in water with a red violet to blue color and directly dyeing cotton red violet, its direct dye becoming on subsequent treatment with copper salts a fast and deep black, substantially as described.

In testimony that I claim the foregoing as my invention I have signed my name in presence of two subscribing witnesses.

CARL SCHLEUSSNER.

Witnesses:
 HEINRICH HAHN,
 ALFRED BRISBOIS.